United States Patent [19]

Bright

[11] 4,158,102
[45] Jun. 12, 1979

[54] ENCLOSURE FOR EQUIPMENT

[76] Inventor: William L. Bright, 900 Portway Ave., Hood River, Oreg. 97031

[21] Appl. No.: 890,375

[22] Filed: Mar. 27, 1978

[51] Int. Cl.² .......................................... E02D 29/10
[52] U.S. Cl. .................................. 174/52 R; 52/80; 52/169.6; 174/37; 174/50; 220/18; 312/100
[58] Field of Search ................... 174/38, 37, 50, 52 R; 220/18; 312/100, 223; 52/169.6, 169.7, 20, 21, 80; 336/90

[56] References Cited

U.S. PATENT DOCUMENTS

| 3,513,248 | 5/1970 | Bright et al. | 174/50 X |
| 3,672,103 | 6/1972 | Kost | 52/169.6 X |
| 3,868,040 | 2/1975 | Langmack et al. | 174/50 X |
| 3,944,718 | 3/1976 | Bright | 174/50 |

FOREIGN PATENT DOCUMENTS 873579  6/1971  Canada ..................................... 174/37

*Primary Examiner*—Bruce A. Reynolds
*Assistant Examiner*—D. A. Tone
*Attorney, Agent, or Firm*—Eugene M. Eckelman

[57] ABSTRACT

A lightweight tubular housing open at both ends is specially constructed so as to be buried in the earth to almost its full height and yet withstand thrust forces of fill material. For this purpose the housing has outwardly curved side walls, it is tapered to a larger dimension toward the bottom, and its walls have an increasing outward curvature toward the bottom. The front wall of the housing is of less height than the rear wall to provide front access to the equipment. An inverted cup-shaped cover closes the upper open end of the housing and has a hinged connection that allows it to be opened or to be readily disconnected. To allow the housing to be buried throughout most of its height if necessary as well as to provide a large area at the lower portion of the housing for storing excess length of cable and for adjusting the cable laterally for convenient hook-up to the equipment, the front access opening preferably extends only a minimum distance down from the top relative to the over-all height of the enclosure.

8 Claims, 9 Drawing Figures

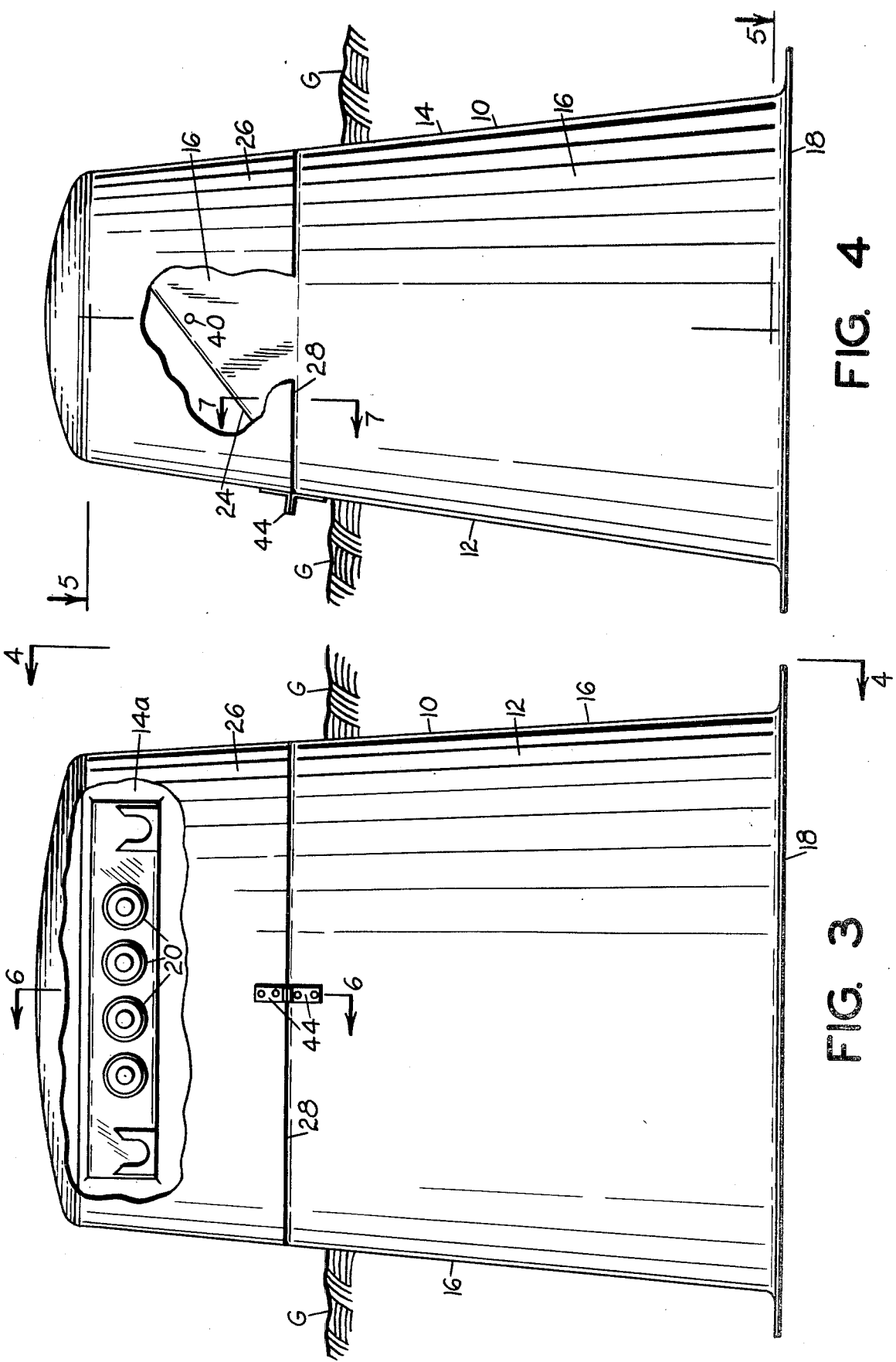

4,158,102

ENCLOSURE FOR EQUIPMENT

BACKGROUND OF THE INVENTION

This invention relates to new and useful improvements in enclosures and particularly to enclosures of a type arranged to house electrical equipment or the like.

Enclosures have heretofore been provided to house various types of equipment such as electrical apparatus in the form of switching mechanisms, transformers, or other apparatus in distribution systems. It is desired that such enclosures be reasonably economical to manufacture, that they be light in weight, and that they be sturdy in their construction to protect the enclosed equipment against adverse effects of the weather and unauthorized entry. Furthermore, it is desired that such enclosures have easy access to authorized personnel for the installation and maintenance of enclosed equipment and also have an inside area which can hold excess length of the cable that extends up through the bottom of the enclosure so that if end portions of the cables within the enclosure need renewing, a sufficient supply of the cable is available without having to thread in new cable or splice it. It is also desirable that such inside area be large enough to allow lateral movement of the cable as required during switching operations. It is further desired that this type of lightweight enclosure have constructional features that allow it to be buried in the ground to a depth sufficient to eliminate problems of frost heaving and water run-off and yet be strong enough so as not to collapse from the forces of the fill material.

SUMMARY OF THE INVENTION

According to the present invention and forming a primary objective thereof, an enclosure is provided that possesses all the above mentioned features.

According to the invention, the enclosure is constructed of glass fiber or other durable, lightweight material and comprises an open ended, tubular housing arranged to support equipment at a rear upper portion thereof. The upper end of the housing is closed by a cover which also encloses a front access opening extending a minimum distance down from the top. The housing tapers outwardly toward the bottom and in addition to such taper, the walls have a novel outward curvature structurally reinforcing the housing against inward forces which may result from fill material. The invention will be better understood and additional objects and advantages will become apparent from the following description taken in connection with the accompanying drawings.

BRIEF DESCRIPTION OF THE DRAWINGS

FIG. 3 is a front elevational view of the enclosure, a portion of this view being broken away;

FIG. 4 is a side elevational view of the enclosure taken on the line 4—4 of FIG. 3, a portion of this view also being broken away;

DETAILED DESCRIPTION OF A PREFERRED EMBODIMENT

Figure 1:
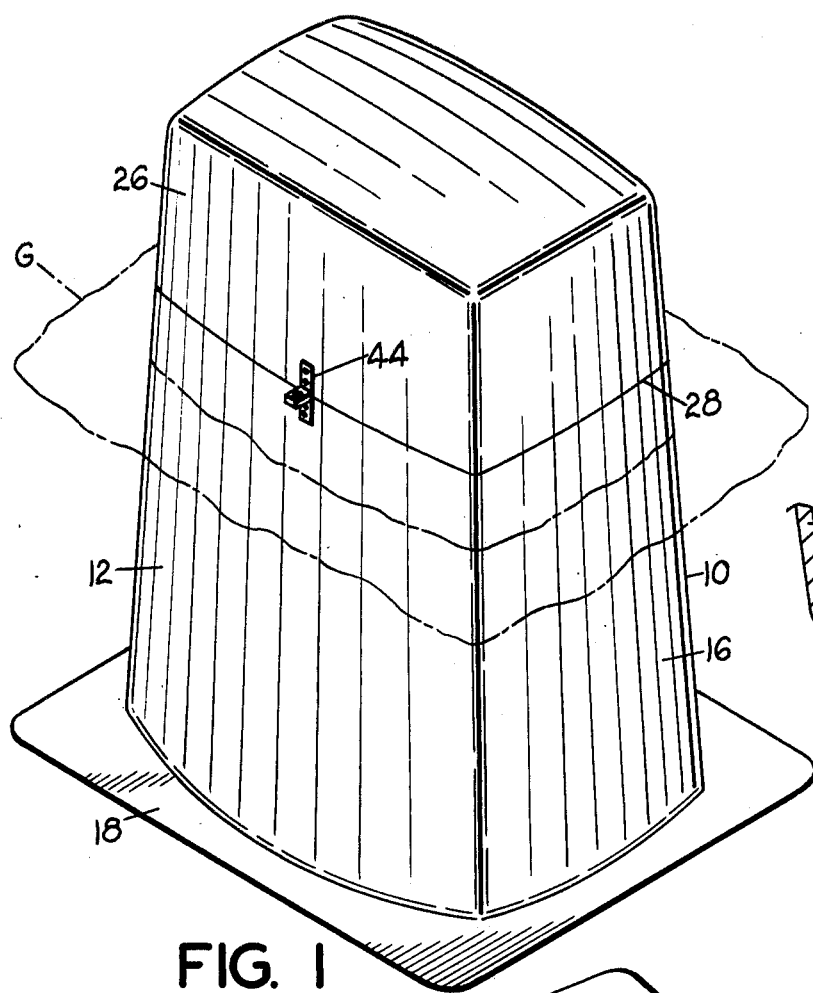
FIG. 1 is a perspective view of an enclosure of the instant invention and showing diagrammatically a ground buried relation of the enclosure.

With particular reference to the drawings, the enclosure of the present invention comprises a tubular housing or body member 10 having a front wall 12, a rear wall 14, and side walls 16. The bottom of the housing is open and its bottom edge has an outwardly turned flange 18 structurally reinforcing the housing. Although the enclosure may be supported at ground level and be secured on a concrete pad, it was primarily designed to be buried in the ground G as illustrated in FIGS. 1, 3 and 4. When so buried, the flange 18 acts as a support directly on the dirt without any concrete pad being necessary, and backfill tamped against the flange securely anchors the enclosure in the ground. If the enclosure is seated on a concrete surface pad, the flange 18 provides a good seal at the bottom.

Figure 6:
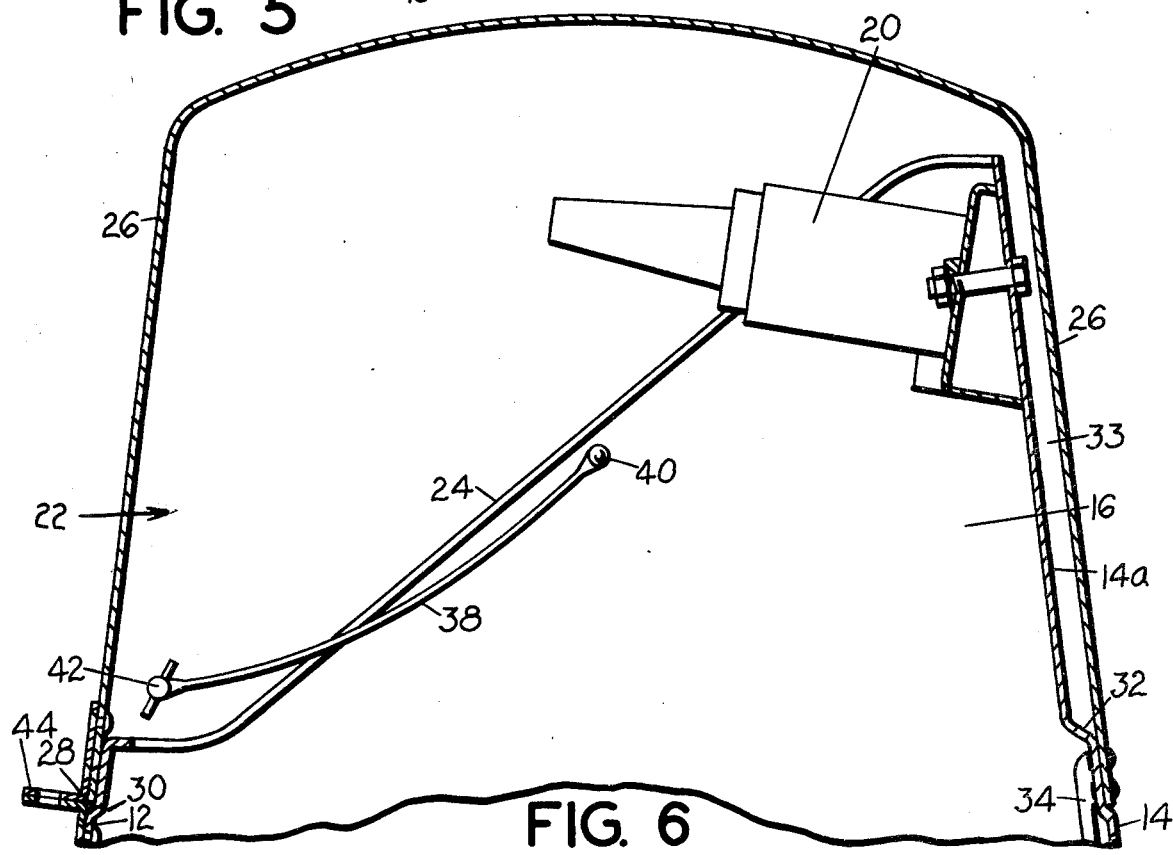
FIG. 6 is an enlarged fragmentary sectional view taken on the line 6—6 of FIG. 3.

The rear wall 14 of the housing has a substantially straight upper portion 14a, FIGS. 3 and 6, providing a support for equipment 20 to be contained within the housing. The front wall 12 of the housing terminates short of the top to provide an access opening 22 from the front and top. The side walls 16 at their upper edges 24 lead angularly down from the top of wall portion 14a to the bottom of the access opening 22.

Figure 7:
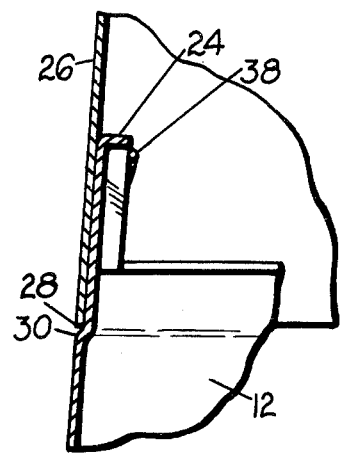
FIG. 7 is an enlarged fragmentary sectional view taken on the line 7—7 of FIG. 4.

A cover or lid 26 is arranged to seat on the top portion of the housing 10 to provide a weatherproof and secure enclosure. This cover is of inverted cup-shape or flanged structure having a bottom edge 28 arranged to seat on a shoulder 30, FIGS. 6 and 7, formed by an inset portion in all four walls of the housing a short distance below the access opening 22. The cover has overlapping engagement with the housing at all points around the latter and thus a connection is provided which is tight to the weather and also tight to probing or entry by unauthorized personnel. Rear wall portion 14a is offset inwardly from a lower portion 32, FIG. 6, to provide a clearance space 33 for fastener portions of the equipment disposed between the wall 14a and the cover 26.

Figure 8:
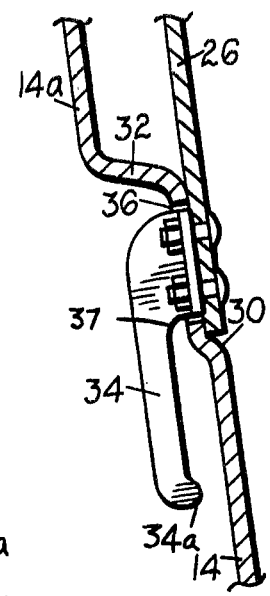
FIGS. 8 and 9 are detail views of hinge means for the cover and illustrating closed and open positions thereof.
Figure 9:
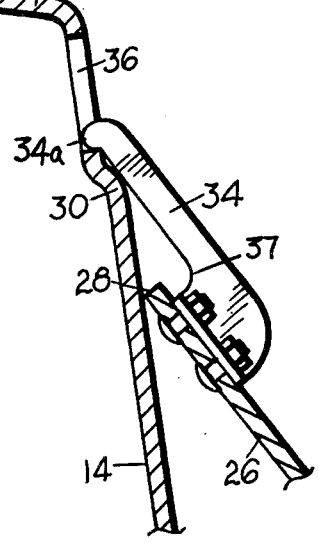
Figure 2:
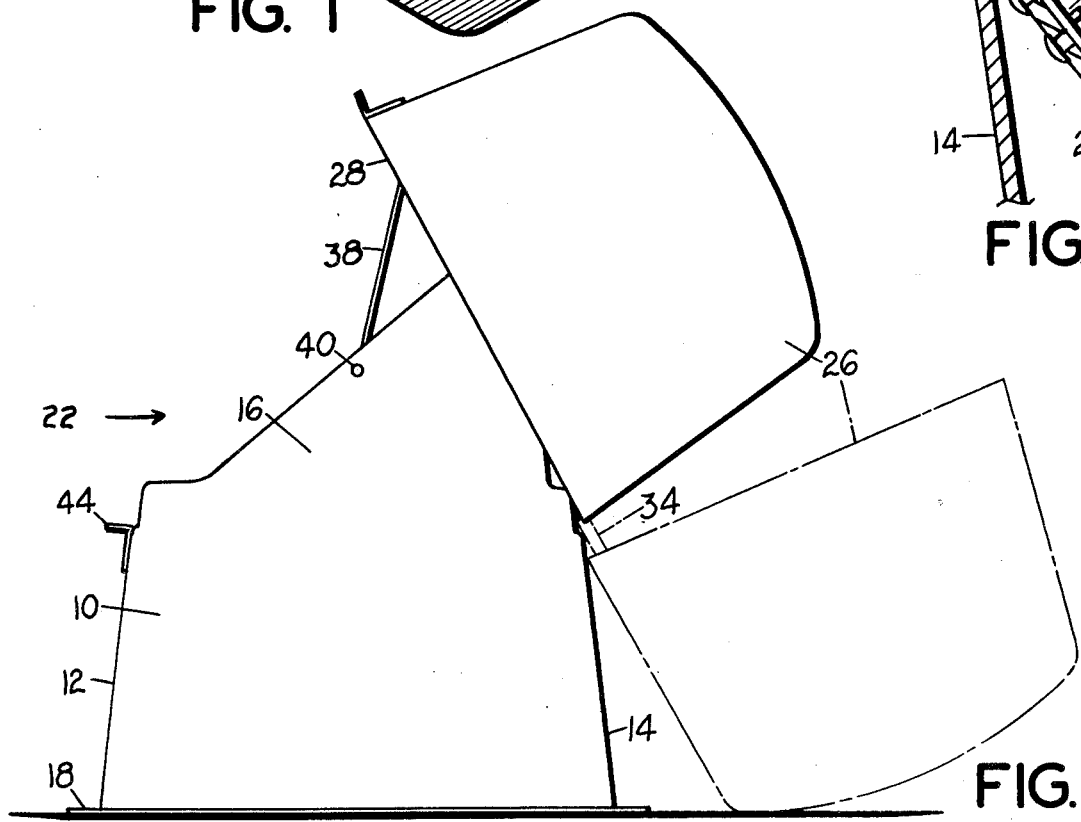
FIG. 2 is a diagrammatic side elevational view of the enclosure showing open positions of its cover in full and broken lines.

The cover 26 has a hinge connection at the rear that either allows it to be rotated back to fully expose the top opening or to be detached completely from the housing. For this purpose, the rear wall of the cover has two or more inwardly offset, downwardly extending hooks 34, FIGS. 8 and 9, secured to a lower portion thereof. These offset hooks have end knobs 34a and project inwardly through vertical slots 36 in the wall portion 14 and down along the inside of wall 14, FIG. 8, when the cover is closed. When the cover is opened to the full line position shown in FIG. 2, the hooks pivot in the slots 36 to a position where an upper rounded portion 37 thereof engages the bottom edge of slots 36, the main depending portion of the hooks still being disposed within the housing and holding the rear of the cover attached to said housing. The cover may also be swung fully open to rest on the ground at the rear of the housing if desired, as shown in broken lines in FIG. 2, in which event end knobs 34a of the hooks 34 rest against the bottom edge of slots 36 as shown in FIG. 9. To fully detach the cover from the housing, it is swung completely open to the FIG. 2 broken line position and then lifted slightly to clear the ends of hooks 34 from the bottom of slots 36. This cover is then moved rearwardly to disengage the hooks fully from the slots. To limit the opening of cover 26 and to prevent strain on the hinges and housing, one or more check cords 38 are attached between a top portion of the housing and a front portion of the cover. These cords are secured integrally at one end 40 to one or the other of the cover or housing and have removable connection 42 to the other. By detaching the one end of the cord, the cover can be fully removed from the housing if desired. Suitable hasp means 44 are provided between the housing and the cover at the front to receive a padlock or the like, and by such lock means together with the structure of the pivot hooks 34, the cover is securely locked in place.

The lift off cover provides easy and complete access to the equipment 20 from the top and front. Since the wall portion 14a is an integral part of the housing 10 and the side walls 16 angle up to the top of the wall portion 14a, the latter is securely reinforced for sturdy support of the equipment 20. This mounting support will withstand the thrust, pull or torsion forces required to be used from tools such as hot sticks for mounting and operating the equipment. The cover not only allows easy access to the housing but its top mounting allows a minimum height front opening to be used, whereby a maximum enclosed lower housing area is provided which gives sufficient space for maneuvering the cable during switching operations. Also, excess length of cable connected to the equipment 20 can be stored, with the result that cable leading into the enclosure can be looped or wound in the lower unused portion of the enclosure before being connected to the equipment 20 and if it is necessary to renew a connection of the cable on the equipment, the same cable can be used. It is thus not necessary to thread in new cable or to make a splice. The access opening 22 extends down only a short distance from the top as related to the over-all height of such enclosure and preferably it extends down less than one-half the height of the enclosure to provide the desired space in the interior for storage and maneuvering.

As stated, the housing 10 is constructed from glass fiber or the like, and in order to withstand lateral forces from fill material around the buried portion, the walls 12, 14 and 16 have a special construction. First, such walls are outwardly curved or bowed. In addition, the housing is tapered to a larger dimension toward the bottom. Further yet, the curvature of the walls is progressively greater toward the bottom, or in other words the curvature has a shortening radius from top to bottom. Such enlarging taper, outward curvature, and shortening radius provide increasing strength toward the bottom. This progressive reinforcement compensates for the increasing forces of the fill material as the depth of fill is increased.

Figure 5:
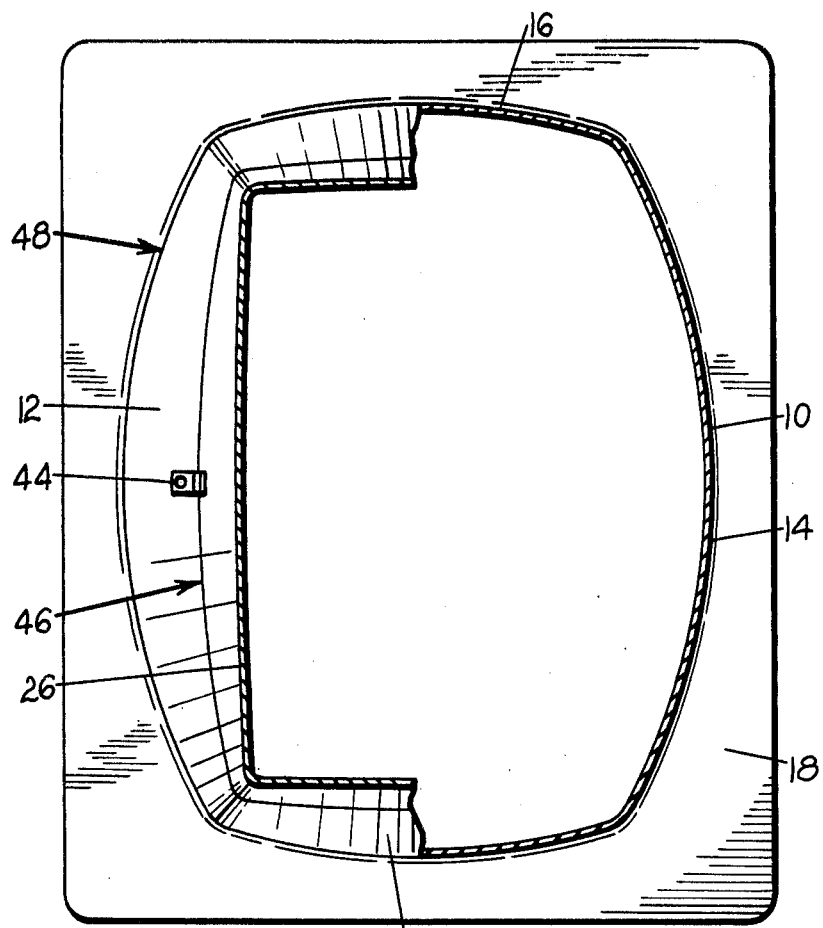
FIG. 5 is an offset sectional view taken on the line 5—5 of FIG. 4.

To illustrate the wall structure, reference is made to FIG. 5 wherein the reference numeral 46 designates a top portion of the side walls of the housing. This portion of the side walls is substantially straight or only slightly curved, thus having a substantially long radius. The reference numeral 48 designates a bottom portion of the side walls of the housing. This portion of the side walls has a greater outward curvature, namely a shorter radius, compared to the top. The increasing curvature progresses uniformly from top 46 to the bottom 48. The outward curvature of the wall portions may be arcuate, elliptical, or of any other suitable shape to provide the necessary strength.

According to the present invention, an enclosure is provided that is simplified in construction, light in weight, durable, and economical to manufacture. Easy access to the electrical equipment is provided, and in addition, the arrangement provided by the cover and access opening, as well as the excess lower length of the housing, allows for the storage of excess length of cable in the lower portion of the enclosure and for adequate maneuvering in installation and operation. The enclosure when buried reinforces itself against any depth of fill material up to the bottom of the front access opening, thus providing an enclosure that can be made substantially inconspicuous and furthermore one that can be buried to a depth which will not be affected by frost-heaving or surface water run-off. The enclosure is firmly anchored in the ground by fill dirt on the flange and the expense of a concrete pad can be eliminated.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An enclosure for equipment comprising
   (a) a vertical tubular housing having an inner area defined by surrounding front, rear and side walls,
   (b) the lower end of said housing being open for receiving cable extending up from the ground,
   (c) the upper end of said housing being open throughout its entire cross sectional area,
   (d) a substantially straight wall portion at the upper end of said rear wall arranged to support equipment to be connected to the cable,
   (e) said front wall being of less height than said rear wall to provide a front access opeing to the equipment supported on the upper portion of said rear wall,
   (f) the walls of said housing being curved outwardly at a progressively smaller radius toward the bottom,
   (g) and a cover having a downwardly extending flange and arranged to cover said upper open end including said front wall opening.

2. The enclosure of claim 1 wherein said housing has inset means at the upper portion of said front wall forming a shoulder arranged to provide a seat for the bottom edge of said cover in the mounted position of said cover on said housing.

3. The enclosure of claim 1 wherein said straight wall portion of said rear wall is offset inwardly to provide a space for equipment fastening means between said straight wall portion and said cover.

4. The enclosure of claim 1 wherein said side walls have angled top edges extending upwardly from the bottom of said access opening to the top of said rear wall.

5. The enclosure of claim 1 wherein said housing is tapered to a larger dimension toward the bottom.

6. The enclosure of claim 5 including an outwardly turned flange at the bottom of said housing arranged either to support said housing on a surface pad or to anchor said housing in the ground when said housing is partially buried.

7. An enclosure for equipment comprising (a) a vertical tubular housing having an inner area defined by surrounding front, rear and side walls,
(b) the lower end of said housing being open for receiving cable extending up from the ground,
(c) the upper end of said housing being open throughout its entire cross sectional area,
(d) a substantially straight wall portion at the upper end of said rear wall arranged to support equipment to be connected to the cable,
(e) said front wall being of less height than said rear wall to provide a front access opening to the equipment supported on the upper portion of said rear wall,
(f) said front access opening extending down less than one-half the height of said housing,
(g) and a cover having a downwardly extending flange and arranged to cover said upper open end including said front wall opening, the walls of said housing being curved outwardly at a progressively smaller radius toward the bottom.

8. The enclosure of claim 7 including an outwardly turned flange at the bottom of said housing arranged either to support said housing on a surface pad or to anchor said housing in the ground when said housing is partially buried.

* * * * *